US006365814B1

(12) United States Patent
Matsuda

(10) Patent No.: US 6,365,814 B1
(45) Date of Patent: Apr. 2, 2002

(54) ELECTRONIC MUSICAL INSTRUMENT AND RECORDING MEDIUM

(75) Inventor: Toshinori Matsuda, Hamamatsu (JP)

(73) Assignee: Kabushiki Kaisha Kawai Gakki Seisakusho, Hamamatsu (JP)

( * ) Notice: Subject to any disclaimer, the term of this patent is extended or adjusted under 35 U.S.C. 154(b) by 0 days.

(21) Appl. No.: 09/400,735

(22) Filed: Sep. 22, 1999

(30) Foreign Application Priority Data

Sep. 25, 1998 (JP) .......................................... 10-272026
Sep. 30, 1998 (JP) .......................................... 10-278211

(51) Int. Cl.[7] ............................................... G09B 15/02
(52) U.S. Cl. ..................... 84/477 R; 84/470 R; 84/478; 84/485 R; 84/609
(58) Field of Search ................... 84/601–602, 604–606, 84/470 R, 477 R, 478, 483.2, 484, 485 R, 609–613, 634–637, 479 A; 434/307 A; 369/47; 395/806

(56) References Cited

U.S. PATENT DOCUMENTS 5,287,789 A * 2/1994 Zimmerman .............. 84/477 R
5,408,686 A * 4/1995 Mankovitz ................... 369/47
5,499,921 A * 3/1996 Sone ....................... 434/307 A
5,526,284 A * 6/1996 Mankovitz .............. 364/514 R
5,538,430 A * 7/1996 Smith et al. ................ 434/308
5,649,234 A * 7/1997 Klappert et al. ............ 395/806
5,701,511 A * 12/1997 Smith ......................... 395/806
5,746,605 A * 5/1998 Kennedy ................ 434/307 A
5,783,764 A * 7/1998 Amar ........................ 84/479 A
5,980,262 A * 11/1999 Tseng et al. ............ 434/307 A
RE37,131 E * 4/2001 Mankovitz ................... 369/47

* cited by examiner

*Primary Examiner*—Marlon T. Fletcher
(74) *Attorney, Agent, or Firm*—Christie, Parker & Hale, LLP

(57) ABSTRACT

In an electronic musical instrument having a function to perform auto-playing with reading out a quantity of auto-play data every time any key is operated, a guide display comprising a plurality of display lines is made to indicate timings of key operation. In the display, measure lines (23) and beat lines (24) are displayed in addition to black circles (22) for indicating operation timings. Thereby, more pieces of guide information than a conventional one can be displayed at once, besides, guidance to a far future can be given. This makes it easy to recognize the musical time pattern of the auto-play data and which beat each black circle (22) belongs to.

3 Claims, 14 Drawing Sheets

ELECTRONIC MUSICAL INSTRUMENT AND RECORDING MEDIUM

BACKGROUND OF THE INVENTION

1. Field of the Invention

The present invention relates to electronic musical instruments and recording media storing computer programs for such electronic musical instruments, more specifically to an electronic musical instrument or auto-play apparatus having an auto-play function for playing music based on auto-play data in accordance with a player operating an operation piece such as a key or pad.

2. Description of the Related Art

Auto-play apparatus have been proposed in which several units of auto-play data are prepared beforehand and, for automatically playing a musical composition, the corresponding unit of the auto-play data is read out successively every time a player operates an arbitrary operation piece such as a key or pad. In such an auto-play apparatus, every time an operation piece is operated once, data on one note (a set of notes in case of a chord) is read out. The player operates an operation piece, e.g., depresses an arbitrary key on a keyboard repeatedly in a rhythm or at a tempo suitable for the musical composition to play.

An auto-play apparatus with a note navigation function is known, which is provided with a display unit to show operation timings for depressing a key or the like based on the corresponding auto-play data. Such a display unit is provided, e.g., in an operation panel of the electronic musical instrument in which the auto-play apparatus is installed. FIG. 1 shows an example of such a note navigation display made on a prior art display unit.

Referring to FIG. 1, liquid-crystal display unit 101 provided, e.g., in an operation panel of an electronic musical instrument makes a navigation display to show operation timings for depressing a key or the like. Liquid-crystal display unit 101 of this prior art is capable of displaying laterally at most sixteen characters of ASCII codes or registered characters. It shows only a single line corresponding to the period of four quarter notes.

More specifically, black circles (●) are displayed at positions selected from among the sixteen positions for sixteen characters so that operation timings are indicated with the positions of black circles in the direction from the left to the right in the picture of liquid-crystal display unit 101. When auto-playing corresponding to the displayed line is completed, the display changes to the next line.

By this prior art note navigation display, however, since it shows only a single line of operation timings corresponding to the period of four quarter notes, the player can know operation timings in the immediate future only. Besides, the navigation display changes to the next line after the player depresses a key at the last operation timing displayed on the presently displayed line. At that time, the player can not know the next operation timing until the display changes. This makes it hard to play.

By this prior art note navigation display, the player can know sensuously that the time interval for depressing a key is long where the interval between black circles is great while the time interval is short where the interval between black circles is small. But, by such indication only with black circles, the player can not clearly know the musical time pattern of the auto-play data. Further, it is hard to know which beat of the time pattern the position of each black circle belongs to. These also make it hard to play.

Besides, such a prior art note navigation display shows only operation timings with the positions of black circles. Consequently, when a player likes to play with singing the song corresponding to his or her playing musical composition but forgets the words, he or she must see the navigation display given on liquid-crystal display unit 101 of the electronic musical instrument and the words printed on a paper, alternately. This makes it very hard to sing and play.

SUMMARY OF THE INVENTION

It is the first object of the present invention to provide an electronic musical instrument wherein the information content of a navigation display for operation timings is increased to make it easy to play.

It is the second object of the present invention to provide an electronic musical instrument wherein a player can easily play with singing in accordance with a navigation display even if he or she forgets the words.

According to the present invention, an electronic musical instrument having an auto-play function in which auto-playing is performed with reading out a predetermined quantity of auto-play data prepared beforehand, in order every time an operation piece is operated, comprises guide display means for making a guide display based on said auto-play data for indicating operation timings for operating said operation piece, said guide display comprising a plurality of display lines.

According to this feature of the present invention, a display unit can display more pieces of guide information at once than the prior art display unit, and can make a guide display to a fairly far future. Hence, a player can play with grasping even operation timings in the fairly far future. As a result, it becomes easy to play.

According to another aspect of the present invention, said guide display means changes one or more display lines presently displayed, all operation timings on which had been executed, into new display lines based on said auto-play data when a predetermined operation timing on a predetermined display line is executed.

For example, said guide display means may change the first display line presently displayed into a new first display line when a predetermined operation timing on the last display line presently displayed is executed, and the display lines after the first display line presently displayed into new display lines when a predetermined operation timing on the new first display line is executed.

According to this feature of the present invention, while a player plays in accordance with the guide display of a display line, one or more display lines, all operation timings on which had been executed, can be changed beforehand into new display lines following the display line presently executed. Hence, a guide display for a future can always be given with enough time. As a result, it becomes easier to grasp each operation timing and it becomes still easier to play.

According to still another aspect of the present invention, said guide display means displays measure lines and beat lines based on said auto-play data in addition to the display for indicating operation timings.

According to this feature of the present invention, measure lines and beat lines are displayed together with a display for indicating operation timings. Hence, the information content of the guide display is increased. As a result, it becomes easier to grasp each operation timing.

According to still another aspect of the present invention, in an electronic musical instrument having an auto-play function in which auto-playing is performed with reading out a predetermined quantity of auto-play data prepared beforehand, in order every time an operation piece is operated, said auto-play data includes note data and word data on the words of the corresponding song, and guide display means is provided for displaying words based on word data in said auto-play data, and making a guide display based on word data and note data in said auto-play data for indicating operation timings for operating said operation piece with a predetermined mark moving with bounding on said words displayed synchronously with operations of said operation piece.

According to this feature of the present invention, a guide display for indicating operation timings and a display for words of the corresponding song can be made at the same time on a display unit of the electronic musical instrument. Hence, when a player likes to play with singing, he or she can see both of the guide display and the words at once without turning his or her eyes upon them alternately. As a result, it becomes easy both to sing and to play.

Besides, although an operation piece should be operated when the mark moving with bounding on the words comes to a predetermined position, a player can easily grasp the operation timing by observing the movement of the mark. Hence, it becomes easier to grasp each operation timing. Further, the player can clearly know what part of the words he or she should sing at the time of the operation. As a result, it becomes easy both to sing and to play.

According to still another aspect of the present invention, said guide display means calculates a distance and a level of one jump of said predetermined mark with the number of characters constituting said word data, and a speed in the jump of said predetermined mark with the step time included in said note data and tempo data having been set, and makes a moving display of said predetermined mark based on the calculation results.

According to this feature of the present invention, the distance, level and speed of one jump of the mark are calculated in accordance with the length of the words, a tempo having been set, etc., and a moving display of the mark is made based on the calculation results. Hence, guide displays can be made according to various kinds of auto-play data and tempos variously set. As a result, a guide display can be realized according to any player's taste.

According to still another aspect of the present invention, said guide display means makes a display of said predetermined mark jumping vertically at the first note position with a word after the position corresponding to the portion in said auto-play data that there is note data but no word data corresponding to the note data.

Alternatively, said guide display means inserts an arbitrary mark to the position corresponding to the portion in said auto-play data that there is note data but no word data corresponding to the note data, and displays words including said arbitrary mark as part of them with a moving display of said predetermined mark.

According to this feature of the present invention, even at the position corresponding to the portion in auto-play data that there is note data but no word data corresponding to the note data, the mark for indicating operation timings dose not stop but jumps vertically or jumps at the arbitrary mark inserted there. As a result, operation timings are successively indicated and the next operation timing can surely be known.

According to still another aspect of the present invention, said guide display means makes a display comprising a plurality of display lines for words and said predetermined mark moving on the words.

In this case, said guide display means may change one or more display lines for words presently displayed, all operation timings on which had been executed, into new display lines for words based on said auto-play data when a predetermined operation timing on a predetermined display line is executed.

For example, said guide display means changes the first display line for words presently displayed into a new first display line for words when a predetermined operation timing on the last display line presently displayed is executed, and the display lines for words after the first display line presently displayed into new display lines for words when a predetermined operation timing on the new first display line is executed.

According to this feature of the present invention, a display unit can display more pieces of guide information at once than the prior art display unit, and can make a guide display to a fairly far future. Hence, a player can play with grasping even operation timings in the fairly far future. As a result, it becomes easy to play.

Besides, while the player plays in accordance with the guide display of a display line, one or more display lines for words, all operation timings on which had been executed, can be changed beforehand into new display lines for words following the display line presently executed. Hence, a guide display for a future can always be given with enough time. As a result, it becomes easier to grasp each operation timing and it becomes still easier to play.

According to still another aspect of the present invention, the electronic musical instrument further comprises selection means for a player selecting one as said predetermined mark from among kinds of marks prepared beforehand.

Or, the electronic musical instrument may comprises mark generation means for a player freely making a mark as said predetermined mark.

According to still another aspect of the present invention, in an electronic musical instrument having an auto-play function in which auto-playing is performed with reading out a predetermined quantity of auto-play data prepared beforehand, in order every time an operation piece is operated, said auto-play data includes note data and word data on the words of the corresponding song, and said instrument comprises guide display means for displaying words with a static guide display for indicating operation timings for operating said operation piece.

According to this feature of the present invention, a guide display for indicating operation timings and a display for words of the corresponding song can be made at the same time on a display unit of the electronic musical instrument. Hence, when a player likes to play with singing, he or she can see both of the guide display and the words at once without turning his or her eyes upon them alternately.

DETAILED DESCRIPTION OF THE PREFERRED EMBODIMENTS

Hereinafter, embodiments of the present invention will be described in detail with reference to drawings.

First Embodiment

Figure 2:
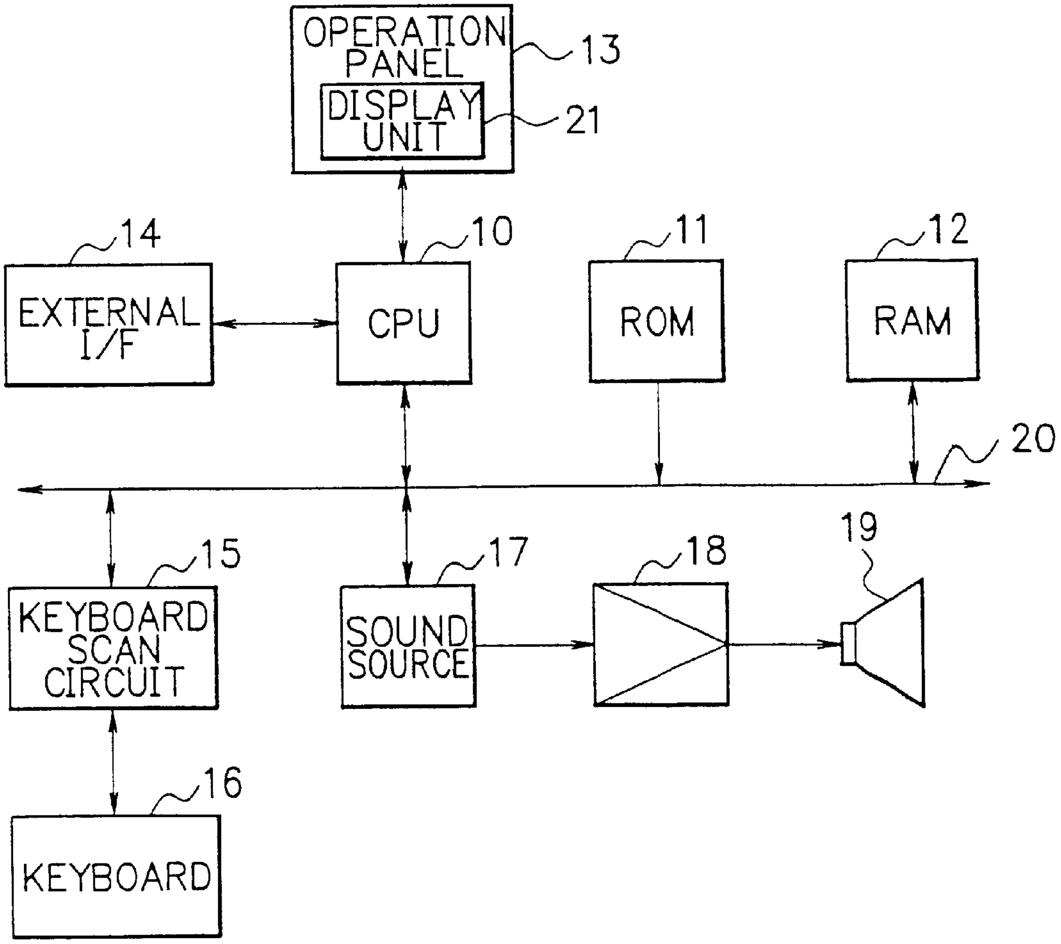
PRIOR ART FIG. 2
FIG. 2 is a block diagram schematically showing the construction of an electronic musical instrument according to the first embodiment of the present invention.

FIG. 2 is a block diagram schematically showing the construction of an electronic musical instrument according to the first embodiment of the present invention, in which an auto-play apparatus is installed. Referring to FIG. 2, CPU 10, ROM 11, RAM 12, keyboard scan circuit 15, and sound source 17 are connected to bus line 20 such as data bus and address bus so as to exchange data among them.

Keyboard scan circuit 15 is connected to keyboard 16. Keyboard 16 may include one or more keyboard units each comprises keys and key switches corresponding to the respective keys. Keyboard scan circuit 15 can detect a key being depressed (ON key) or released (OFF key) and the operation speed (velocity) of the operated key. In auto-play mode, any key on keyboard 16 can be used for instructing to read out auto-play data. Every time a player depresses an arbitrary key, a predetermined quantity of the auto-play data is read out in order and thereby auto-playing progresses.

CPU 10 is connected to operation panel 13 and external I/F 14. Operation panel 13 is provided with various operation members for setting a tone color, a volume, an effect, a rhythm, etc. It is further provided with operation members for selecting auto-play data, setting a tempo, etc., and display unit 21 for displaying various set states of the various operation members and for a navigation display for operation timings. Guide display means according to the present invention comprises such display unit 21 and CPU 10. External I/F 14 comprises, e.g., a MIDI interface.

CPU 10 controls the whole of the electronic musical instrument with using RAM 12 as a work memory in accordance with a control program stored in ROM 11. For example, in manual-play mode, CPU 10 scans the key switches of keyboard 16 and the operation members of operation panel 13 to detect operation states of the keys of keyboard 16 (ON key, OFF key, the key switch number (key number) of each operated key, velocity indicating the operation speed of each operated key, etc.) and operation states of the operation members on operation panel 13. The detection results are supplied to sound source 17 to execute sound production processing according to the operated state of each key or each operation member.

In auto-play mode, CPU 10 reads out from ROM 11 a predetermined quantity of auto-play data selected with a switch on operation panel 13, every time an arbitrary key is depressed. The read-out data is supplied to sound source 17 to make a musical sound signal. At the same time, CPU 10 makes display unit 21 in operation panel 13 make a navigation display for operation timings based on the read-out auto-play data.

ROM 11 stores several units of auto-play data as preset data in addition to programs for making CPU 10 execute various kinds of processing. It also stores, e.g., PCM waveform data used in producing musical sound data in sound source 17. RAM 12 has storage areas for temporarily storing various data necessary for CPU 10 executing a program, and data obtained by various kinds of processing. RAM 12 also stores user data obtained by freely editing auto-play data in ROM 11.

Sound source 17 has sound production channels to produce musical sounds at once. It reads out PCM waveform data from ROM 11 on the basis of information given by CPU 10 on key number (or note), musical sound parameters, etc. The musical sound parameters have been set with operation members. Sound source 17 processes the amplitude and envelope of the read-out data and then adds an effect having been set, to make musical sound data in digital form.

The digital musical sound data thus made in sound source 17 is converted into analog musical sound data with a not-shown D/A converter in sound source 17, and then amplified with amplifier 18 and supplied to loudspeaker 19.

FIGS. 3A to 3D show an example of navigation display made on display unit 21 in operation panel 13. In this embodiment, display unit 21 comprises a bit map liquid crystal display unit capable of displaying any characters, symbols, figures, etc., with dots. It is greater in picture size than the prior art one shown in FIG. 1.

In this embodiment, liquid crystal display unit 21 displays four display lines of operation timings. Each display line corresponds to the period of four quarter notes. On each display line, black circles (●) 22 for indicating operation timings are displayed at positions selected from among the positions arranged in order from the left to the right at regular intervals. In addition to such black circles 22, display unit 21 displays measure lines 23 for indicating the end of each measure, and beat lines 24 for indicating the end of each beat.

The example of FIGS. 3A to 3D show a navigation display based on auto-play data of quadruple time (any-four time). Hence, each display line includes three beat lines 24. The number of beat lines 24 in each display line can vary in accordance with the rhythm of selected auto-play data, as a matter of course. For example, one beat line 24 is displayed at the center in case of duple time (any-two time), seven beat lines 24 are displayed in case of octuple time (any-eight time), and fifteen beat lines 24 are displayed in case of any-sixteen time.

Figure 3A:
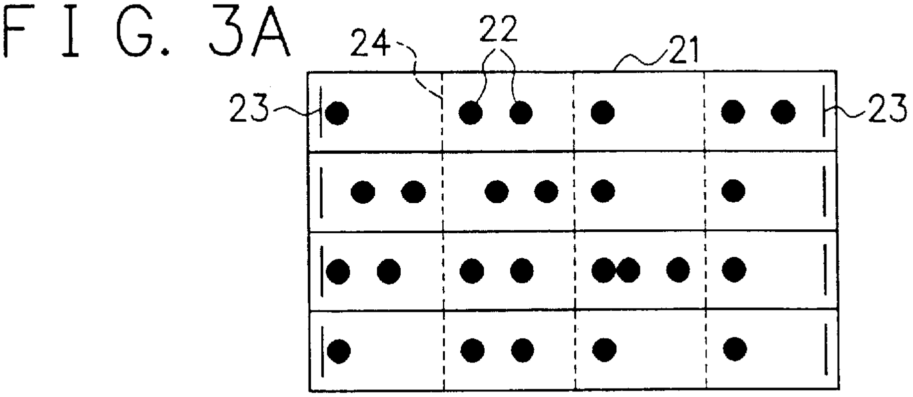
FIGS. 3A to 3D are representations of navigation displays made on a display unit installed in an operation panel of the electronic musical instrument according to the first embodiment.
Figure 3B:
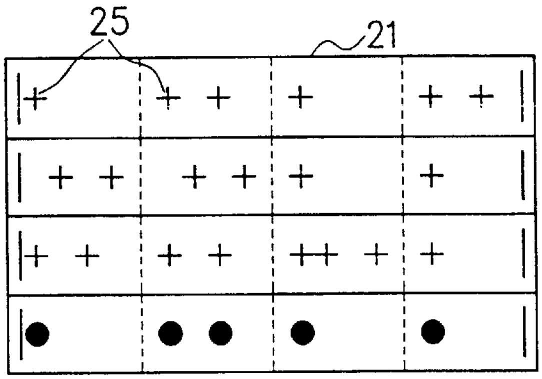

FIG. 3A shows an initial state displayed when a player has selected his or her aiming auto-play data and is going to start auto-playing. In the initial state, all operation timings are indicated with black circles 22. After auto-playing is started by depressing any key, every time the player depresses any key, the display of black circle 22 that has indicated the corresponding operation timing is changed into cross mark (+) 25. FIG. 3B shows the state that auto-playing to the third display line is completed.

Figure 3C:
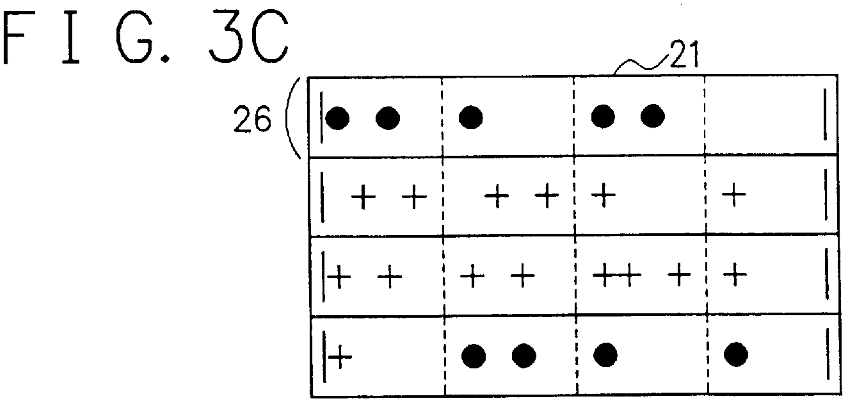

Next, as shown in FIG. 3C, when the player depresses any key at the first operation timing on the fourth display line in accordance with the navigation display, the first display line of the navigation display, all operation timings on which had been executed and are displayed with cross marks 25, is changed into new first display line 26 following the present fourth display line. Note that "an operation timing is executed" means that the key operation corresponding to the operation timing is executed. In the new first display line 26, all operation timings are indicated with black circles 22. If the selected auto-play data is completed on the present fourth display line, such a change of navigation display is not executed.

Figure 3D:
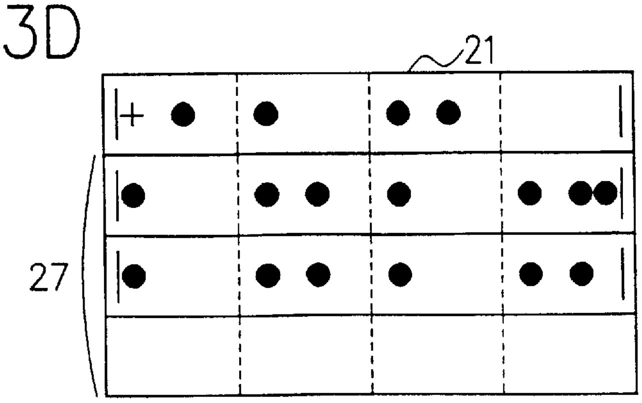

Next, as shown in FIG. 3D, when the player depresses any key at the first operation timing of the new first display line after auto-playing corresponding to the fourth display line is completed, the second to fourth display lines of the navigation display, all operation timings on which had been executed and are displayed with cross marks 25, are changed into new second to fourth display lines 27 following the new first display line. Also in this new second to fourth display lines 27, all operation timings are indicated with black circles 22.

If the auto-play data is completed on the new first display line (the fifth display line in the aggregate), such a change of navigation display is not executed. In such a case, the second to fourth display lines may be replaced by blank. If the rest of the auto-play data is less than three display lines of the second to fourth display lines, it may be possible to display with black circles 22 only the operation timings corresponding to the rest of the auto-play data and followed by blank. The example of FIG. 3D indicates that the auto-play data is completed on the new third display line.

In this example, the first display line is changed when the player depresses any key at the first operation timing on the fourth display line. But, it is also possible to change the first display line when the player depresses any key at a predetermined operation timing after the first operation timing on the fourth display line (except the last operation timing). Further, it is also possible to change the first display line when the player depresses any key at a predetermined operation timing on the second or third display line before the fourth display line.

Besides, in this example, the second to fourth display lines are changed when the player depresses any key at the first operation timing of the new first display line. But, it is also possible to change the second to fourth display lines when the player depresses any key at a predetermined operation timing after the first operation timing on the first display line (except the last operation timing).

In short, any fashion can be employed if a navigation display is changed into the next one not immediately before or after auto-playing corresponding to the last display line is completed but when the part of auto-play data corresponding to the last display line remains to some degree. In this embodiment, however, a distinction between operation timings not yet executed and operation timings having been executed is drawn with black circles 22 and cross marks 25. Hence, if the navigation display is changed at a too early timing, the time for displaying some cross marks 25 become too short. This makes it hard to recognize what part auto-playing has been completed to. For this reason, the example shown in FIGS. 3A to 3D is preferable.

Besides, in the example of FIGS. 3A to 3D, the first display line is changed when the player depresses any key at the first operation timing on the fourth display line. But, there may be a case that the data corresponding to the fourth display line is a whole rest. In such a case, the fourth display line becomes blank as a matter of course. This makes it hard to judge whether the fourth display line is a whole rest or the auto-play data is completed on the third display line. Hence, in such a case, the first display line may be changed when the player depresses any key at the first operation timing on the third display line.

Figure 4:
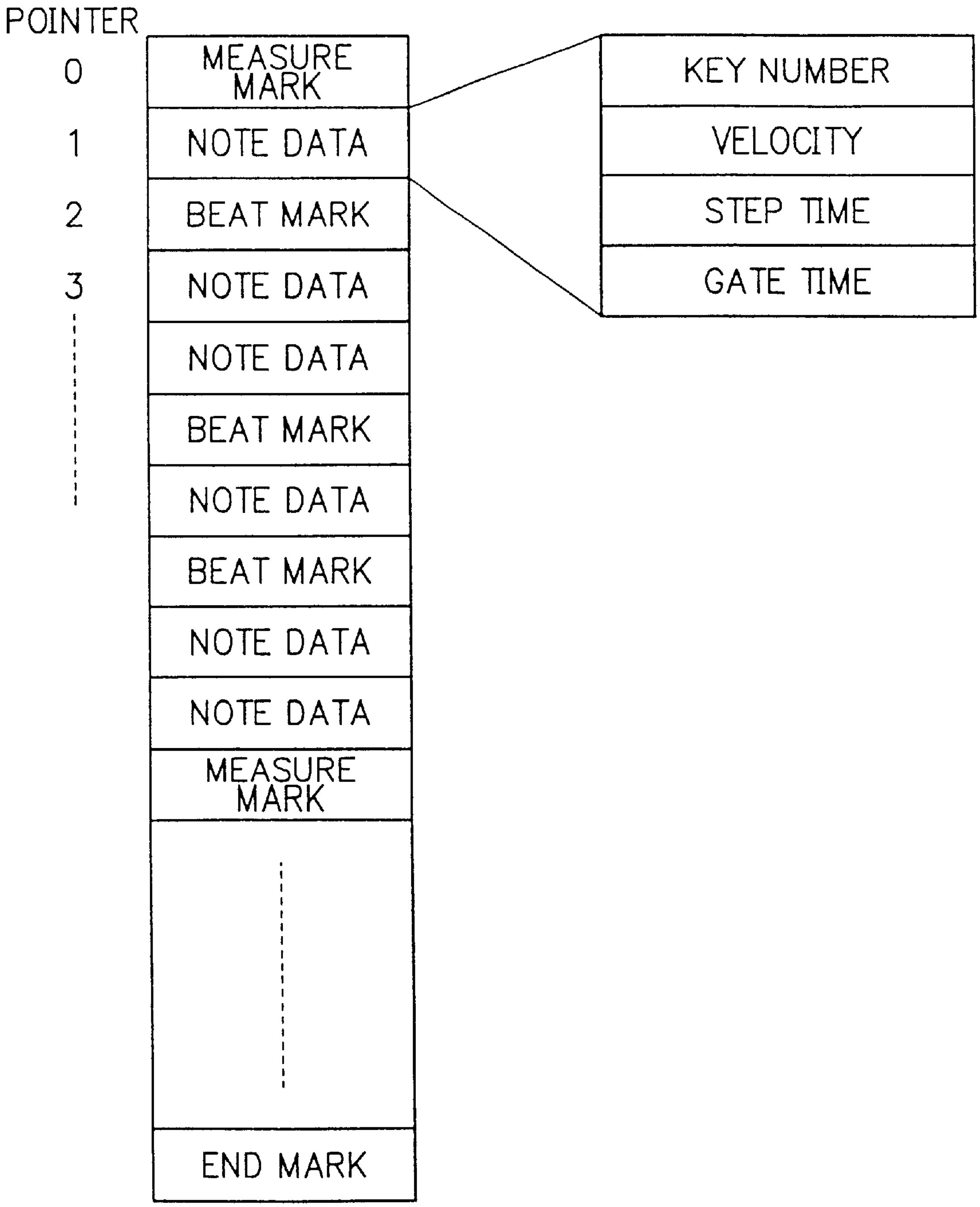
FIG. 4 is a representation of an example of structure of auto-play data according to the first embodiment.

Such a navigation display is made on the basis of auto-play data read out from ROM 11 or RAM 12 of FIG. 2. Auto-play data in ROM 11 is preset data and auto-play data in RAM 12 is user data, as described above. Either is formed into a sequence comprising measure marks, beat marks, note data, and an end mark, as shown in FIG. 4.

Each measure mark includes information on the end of the corresponding measure. It also includes information on the musical time pattern of the auto-play data. The musical time pattern may vary in the middle of the auto-play data. Each beat mark includes information on the end of the corresponding beat.

Note data includes a key number for specifying the pitch of a musical sound, a velocity for indicating the loudness of the sound, a step time for indicating a sound production timing from a measure or beat mark, a gate time for indicating the duration time of the sound, etc. The end mark includes information on the end of the auto-play data.

Auto-play data may further includes information on a repeat end with a repeat mark or the like for indicating a repeat point.

CPU 10 of FIG. 2 first reads a measure mark to display measure lines 23 and beat lines 24 according to information on a musical time pattern included in the measure mark. CPU 10 then reads note data to display black circle 22 at the position distant from the position of the corresponding measure or beat line 23 or 24 by the distance corresponding to the step time included in the note data. In an initial state, such processing is executed for four display lines to make a navigation display, e.g., as shown in FIG. 3A.

After auto-playing is started, every time any key is depressed, CPU 10 executes processing of changing black circle 22 having indicated the corresponding operation timing into cross mark 25. Further, it judges whether or not the operation timing now executed is the first one of the third, fourth or first display line. If the judgement result is affirmative, CPU 10 then executes processing of changing the navigation display as described above.

Figure 5:
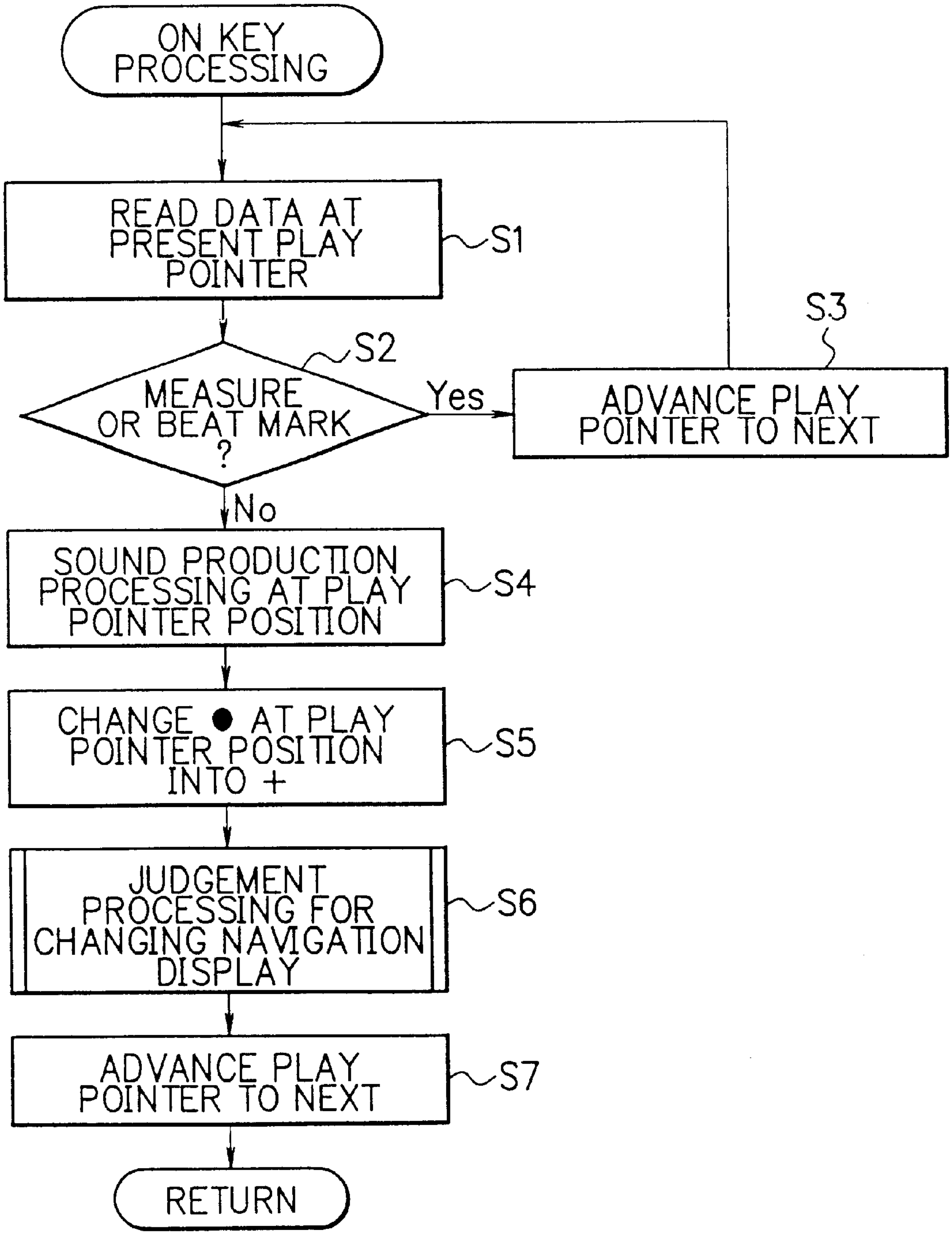
FIG. 5 is a flowchart of sound production processing executed in accordance with the advance of a play pointer.
Figure 6:
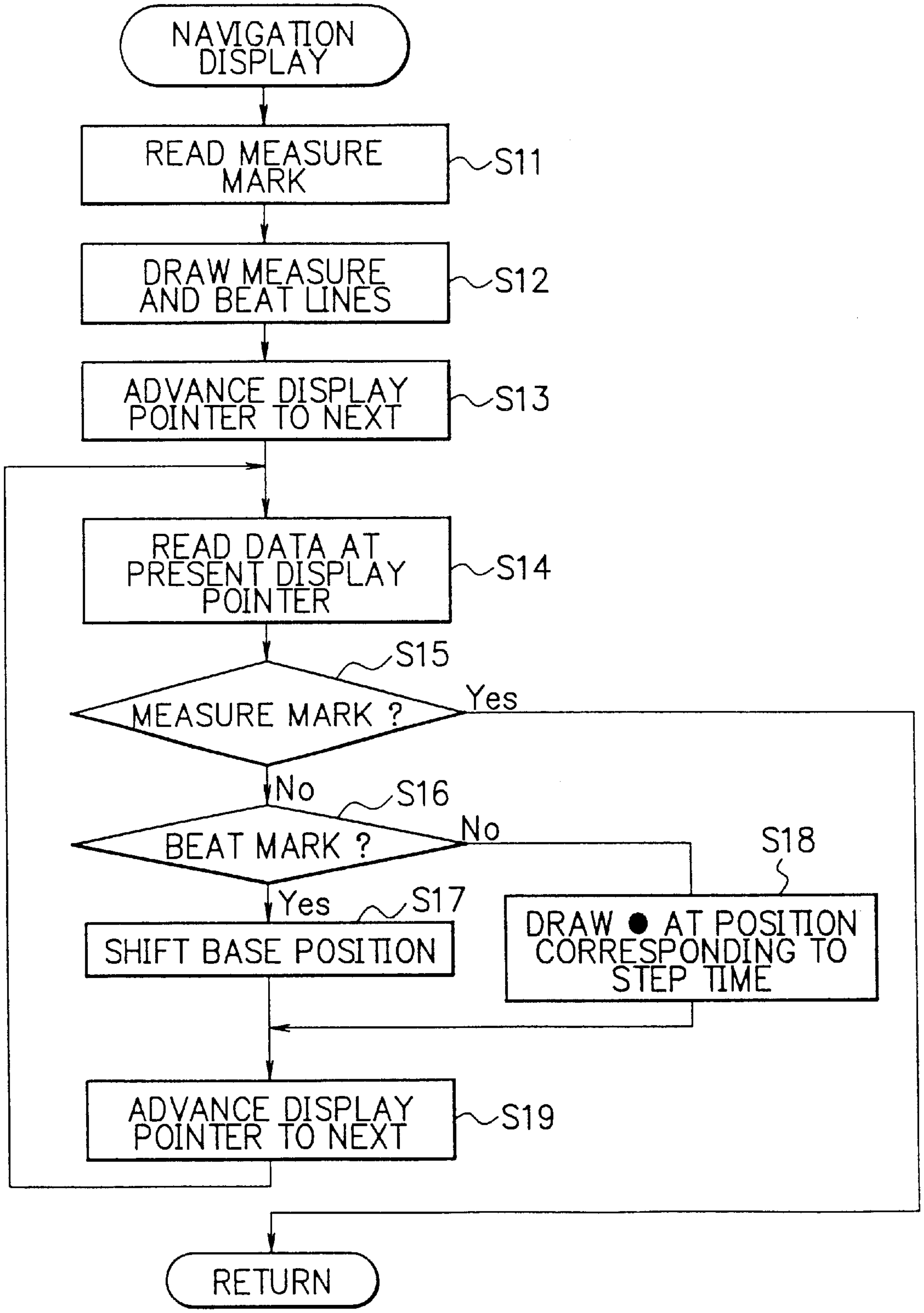
FIG. 6 is a flowchart of navigation display processing executed in accordance with the advance of a display pointer.
Figure 7:
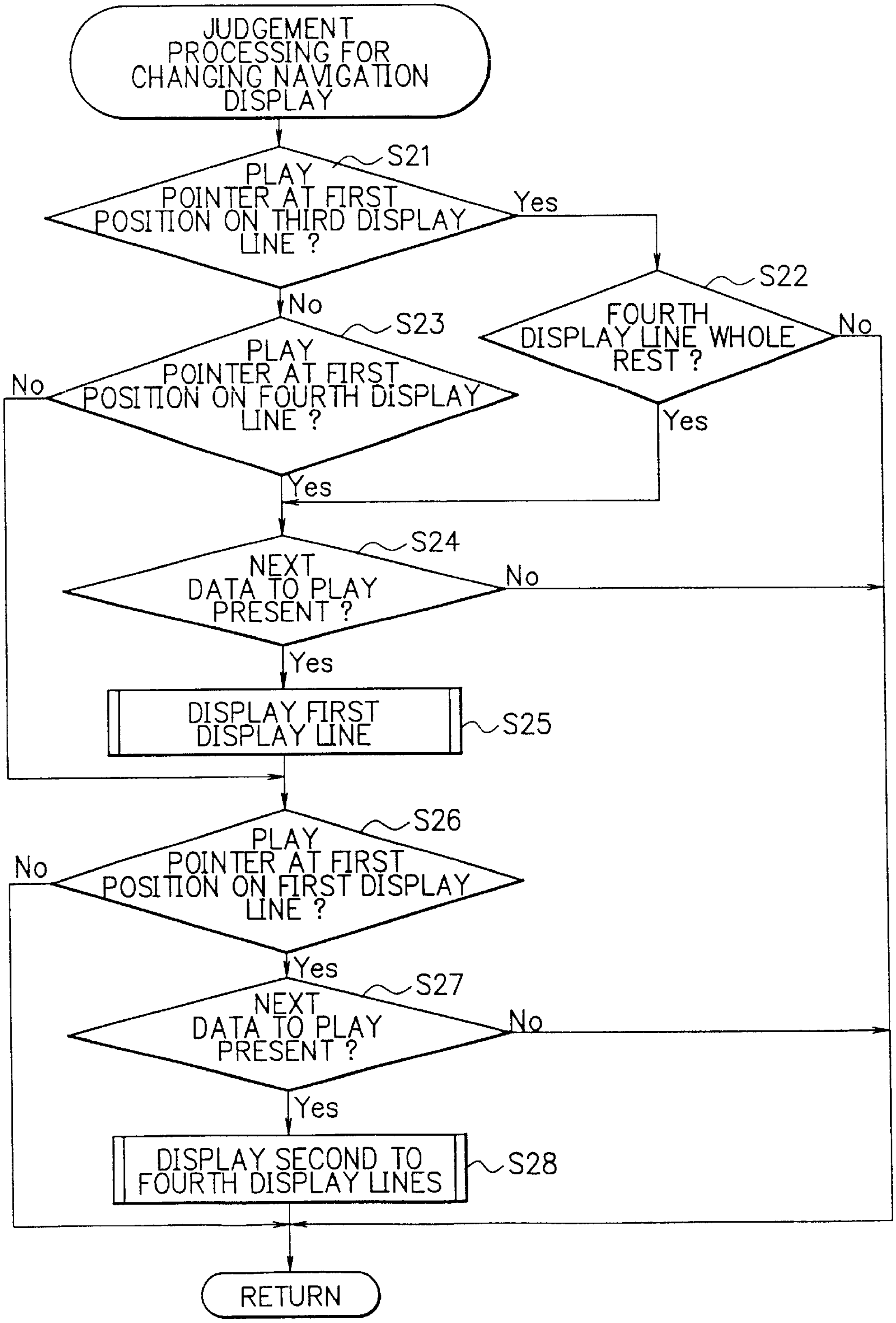
FIG. 7 is a flowchart of judgement processing for changing a navigation display executed in step S6 of FIG. 5 or in step S46 of FIG. 17.

FIGS. 5 to 7 show flowcharts for illustrating operations of the electronic musical instrument according to this embodiment. In this embodiment, either of auto-play processing and navigation display processing is executed on the basis of auto-play data in ROM 11 or RAM 12. But, as for readout pointer on the auto-play data, a dual control is made with a play pointer and a display pointer.

FIG. 5 shows a flowchart of sound production processing based on auto-play data executed in accordance with the advance of the play pointer. This processing is executed when keyboard scan circuit 15 detects any key being depressed.

Referring to FIG. 5, when any key is depressed, CPU 10 reads data presently indicated with the play pointer within auto-play data stored in ROM 11 or RAM 12, in step S1.

In step S2, CPU 10 judges whether or not the read-out data is a measure or beat mark. If the judgment result is YES, the read-out data is not note data, so the flow advances to step S3, wherein the play pointer is advanced to the next position and then the flow returns to step S1. When the read-out data is not any of measure and beat marks, the read-out data is note data, so the flow advances to step S4.

In step S4, CPU 10 makes sound source 17 execute sound production processing in accordance with the note data presently indicated with the play pointer. In step S5, CPU 10 changes the display of black circle 22 indicating the present operation timing into that of cross mark 25 in accordance with the note data. That is, since the position of black circle 22 corresponding to the operation timing now executed can be found from the position of the measure or beat mark just before it on the basis of the step time within the note data, it is changed into cross mark 25.

After judgement processing for changing the navigation display is executed in step S6, the play pointer is advanced to the next position, in step S7, and then this ON key processing is ended. The details of judgement processing executed in the above step S6 will be described later with reference to FIG. 7.

FIG. 6 shows a flowchart of navigation display processing based on auto-play data executed in accordance with the advance of the display pointer. This processing is executed to make a navigation display corresponding to one measure (one display line). As described above with reference to FIG. 3, a navigation display of four display lines is made in an initial state before auto-playing is started. The first display line or second to fourth display lines are changed after auto-playing is started. Hence, in the initial state, the display pointer is ahead of the play pointer by four display lines. After completion of an execution of the flowchart of FIG. 6, the display pointer always stops at the position to indicate the head of a display line (always corresponding to a measure mark).

Referring to FIG. 6, CPU 10 first reads the measure mark presently indicated with the display pointer within auto-play data, in step S11, and makes display unit 21 display measure lines 23 and beat lines 24 on the basis of information on the musical time pattern included in the measure mark, in step S12. In step S13, the display pointer is advanced to the next position. In step S14, CPU 10 reads the data presently indicated with the display pointer.

In step S15, CPU 10 judges whether the read-out data is a measure mark or not. If it is not any measure mark, the flow advances to step S16, wherein CPU 10 judges whether the read-out data is a beat mark or not. When it is a beat mark, the flow advances to step S17, wherein the base position for determining the display position of black circle 22 is shifted to the position of the next beat line 24. Since the display position of black circle 22 is ahead of the position of measure or beat line 23 or 24 just before it by the distance corresponding to a step time, the base position must be shifted in order every time a beat mark is read.

If the judgement result in the above step S16 is NO, the read-out data is note data. In this case, the flow advances to step S18, wherein black circle 22 for indicating an operation timing is displayed at the position ahead of the position of measure or beat line 23 or 24 just before it by the distance corresponding to the step time included in the note data.

After completion of processing of the above step S17 or S18, the display pointer is advanced to the next position, in step S19, and then the flow returns to step S14, wherein CPU 10 reads the data newly indicated with the display pointer. CPU 10 then judges whether the read-out data is a measure mark or not, in step S15. If it is a measure mark, this navigation display processing is ended because the navigation display corresponding to one measure has been completed.

FIG. 7 shows a flowchart of judgement processing for changing a navigation display executed in step S6 of FIG. 5. This processing is executed every time any key is depressed after auto-playing is started by depressing any key. In an initial state before auto-playing is started, a navigation display of four display lines has been made by repeating the process of FIG. 6 four times on the basis of auto-play data when the auto-play data is selected.

Referring to FIG. 7, in step S21, CPU 10 judges whether or not the present play pointer corresponds to the first display position on the third display line of the picture on liquid crystal display unit 21. If the judgement result is YES, the flow advances to step S22, wherein CPU 10 judges whether the fourth display line is a whole rest or not. If the fourth display line is not any whole rest, this processing is ended because it is not at any timing for changing the navigation display at present. If the fourth display line is a whole rest, the flow advances to step S24.

When CPU has judged in the above step S21 that the present play pointer does not correspond to the first position on the third display line, the flow advances to step S23, wherein CPU 10 judges whether or not the present play pointer corresponds to the first position on the fourth display line. If the judgment result is YES, the flow advances to step S24.

In step S24, CPU 10 judges whether or not the next part of the auto-play data (the following part of the fourth display line) is present. If present, the flow advances to step S25, wherein the first display line is changed on the basis of the part of the auto-play data. That is, processing shown in FIG. 6 is executed once here. The flow then advances to step S26.

When CPU 10 has judged in the above step S23 that the present play pointer does not correspond to the first position on the fourth display line, the flow jumps to step S26, wherein CPU 10 further judges whether or not it corresponds to the first position on the first display line. If the judgement result is YES, the flow advances to step S27, wherein CPU 10 judges whether or not the next part of the auto-play data is present. If present, the flow advances to step S28, wherein the second to fourth display lines are changed on the basis of the part of the auto-play data. That is, processing shown in FIG. 6 is executed three times here.

When CPU 10 has judged in the above step S26 that the present play pointer does not correspond to the first position on the first display line, this processing is ended because it is not at any timing for changing the navigation display at present. When CPU 10 has judged in the above step S24 or S27 that the next part of the auto-play data is not present, this processing is ended in spite of the fact that it is at a timing for changing the navigation display at present. This is because auto-playing has progressed to the final stage and there is no part of the auto-play data to play successively.

As described above, in this embodiment, operation panel 13 is provided with liquid crystal display unit 21 that is capable of making a bit map display and greater in picture size than the prior art display unit, so as to make a navigation display for operation timings of four display lines each corresponding to the period of four quarter notes. Hence, the player can play with recognizing not only the operation timing just after the present one but also operation timings in a fairly far future. This makes it easy to play.

Besides, in this embodiment, not only black circles 22 for indicating operation timings but also measure lines 23 and beat lines 24 are displayed. The player can thereby clearly know the musical time pattern of the auto-play data presently selected, and what beat the position of each displayed black circle 22 belongs to. This makes it easier to grasp operation timings.

Further, in this embodiment, while the player plays in accordance with a display line of a navigation display, one or more display lines of the navigation display, all operation timings on which had been already executed, is changed into new display lines. For example, in FIGS. 3A to 3D, the first display line of the present navigation display is changed into new one when auto-playing progresses to enter the last display line, and the display lines after the first display line are changed into new ones when auto-playing progresses to shift from the last display line to the new first display line. In this manner, a navigation display for a future is always given with enough time. This makes it easier to grasp each operation timing and makes it still easier to play.

In the above embodiment, made is a navigation display of four display lines each corresponding to the period of four quarter notes. But the number of display lines is not limited to four. Any number but one can be employed. Besides, the length of each display line is not limited to that corresponding to the period of four quarter notes. It may be longer or shorter than that. Besides, as had been described above, the timings for changing the navigation display are not limited to the first operation timings on the first, third and fourth display lines. Besides, marks for indicating operation timings not yet executed and having been executed are not limited to such black circles 22 and cross marks 25 as described above.

Second Embodiment

The second embodiment of the present invention will be described next. The construction of an electronic musical instrument according to this second embodiment is substantially the same as that shown in FIG. 2. But, in this embodiment, in auto-play mode, CPU 10 executes processing of making display unit 21 in operation panel 13 display a guidance for operation timings and words of the corresponding song on the basis of the read-out auto-play data and tempo data, in addition to processing of reading out a predetermined quantity of the auto-play data from ROM 11 every time any key is depressed, and supplying the read-out data to sound source 17 to make a musical sound.

Figure 8:
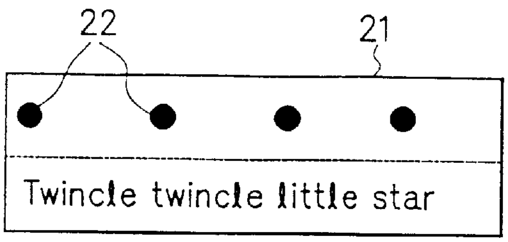
FIG. 8 is a representation of a navigation display made on a display unit installed in an operation panel of an electronic musical instrument according to the second embodiment of the present invention.

FIG. 8 shows an example of navigation display made on display unit 21 in operation panel 13 of FIG. 2. In this embodiment, display unit 21 comprises a bit map liquid crystal display unit capable of displaying any characters, symbols, figures, etc., with dots. It is greater in picture size than display unit 101 of the prior art shown in FIG. 1.

In this embodiment, liquid crystal display unit 21 makes a display for indicating operation timings with black circles (●) 22, and a display of words of the song corresponding to the auto-play data. Each display corresponds to the period of four quarter notes. The operation timings are indicated with the positions of black circles 22 selected from among the positions arranged in order from the left to the right at regular intervals, like the prior art. As for the words, the corresponding part is displayed close to the left.

FIG. 8 shows an initial state displayed when a player has selected his or her aiming auto-play data and is going to start auto-playing. In the initial state, all operation timings are indicated with black circles 22. After auto-playing is started by depressing any key, every time the player depresses any key, the display of black circle 22 corresponding to the executed operation timing is changed into cross mark (+) 25. When the player depresses any key at the last operation timing displayed, the navigation display (including the words) is changed into new one corresponding to the following part of the auto-play data. If the following part is not present, such a change of navigation display is not executed.

Figure 9:
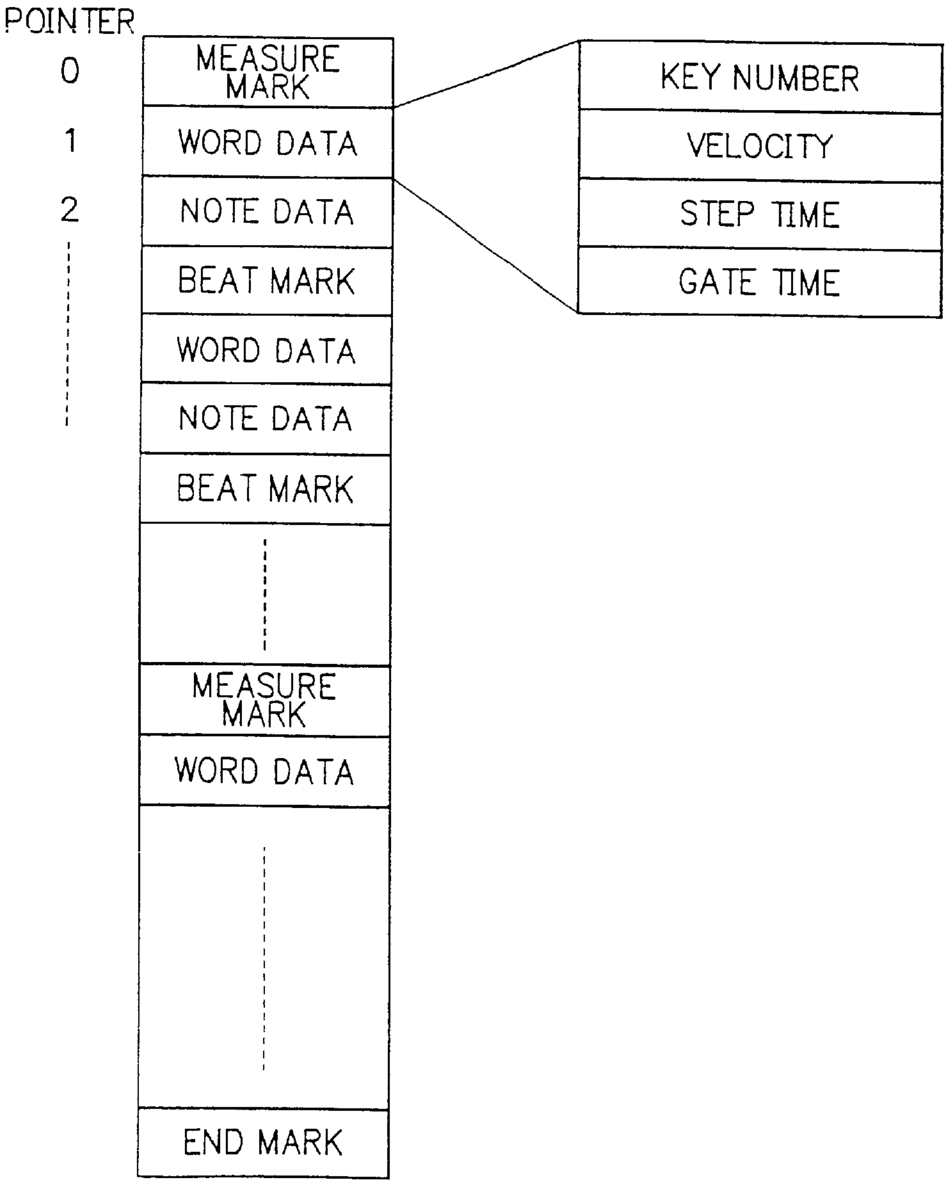
FIG. 9 is a representation of an example of structure of auto-play data according to the second embodiment.

Such a navigation display is made on the basis of auto-play data read out from ROM 11 or RAM 12 of FIG. 2. Auto-play data in ROM 11 is preset data and auto-play data in RAM 12 is user data, as described above. Either is formed into a sequence comprising measure marks, beat marks, word data, note data, and an end mark, as shown in FIG. 9.

Each measure mark includes information on the end of the corresponding measure. It also includes information on the musical time pattern of the auto-play data. The musical time pattern may vary in the middle of the auto-play data. Each beat mark includes information on the end of the corresponding beat. Word data includes information on a word of the corresponding song in form of text data.

Note data comprises a key number for specifying the pitch for a musical sound, a velocity for indicating the loudness of the sound, a step time for indicating a sound production timing from a measure or beat mark, a gate time indicating the duration time of the sound, etc. The end mark includes information on the end of the auto-play data.

Auto-play data may further includes information on a repeat end with a repeat mark or the like indicating a repeat point.

Operations for making a navigation display based on such auto-play data will be described below. CPU 10 of FIG. 2 reads such auto-play data as shown in FIG. 9 in order of the pointer positions from the top as 0, 1, 2, . . . . When CPU 10 reads note data, it makes display unit 21 display black circle 22 at the position distant to the right from the position of the measure or beat mark just before it by the distance corresponding to the step time included in the note data. When CPU 10 reads word data, it makes display unit 21 display the word successively to that displayed just before. In an initial state, such a process corresponding to one display line (one measure) is executed to make a navigation display, e.g., as shown in FIG. 8.

As for measure mark, it is displayed always at the left end position of the picture of liquid crystal display unit 21. As for beat mark, it is displayed at each of the positions determined by equally dividing the lateral length of the picture in accordance with information on the musical time pattern included in a read-out measure mark. For example, in case of auto-play data of duple time, it is displayed at the central position that equally divides the length of the picture into two. In case of auto-play data of quadruple time, it is displayed at each of three positions that equally divide the length of the picture into four. The above-mentioned position of the beat mark just before black circle 22 corresponds to one of them.

After auto-playing is started, every time any key is depressed, CPU 10 changes black circle 22 having indicated the executed operation timing into a cross mark (+). Further, it judges whether or not the operation timing now executed is the last one presently displayed. If so, CPU 10 executes processing of changing the navigation display into the next one as described above.

In this embodiment, either of auto-play processing and navigation display processing for operation timings and words is executed on the basis of auto-play data in ROM 11 or RAM 12. But, as for readout pointer on the auto-play data, a dual control is made with a play pointer and a display pointer.

More specifically, in an initial state, the play pointer is positioned at the head (pointer 0) since auto-playing is not yet started. In contrast to this, the display pointer has advanced to the position ahead of the play pointer by one measure because a navigation display of one measure has been made even in the initial state.

After auto-playing is started, the play pointer is advanced in order every time any key is depressed while the display pointer remains at the same position. When any key is depressed at the last operation timing presently displayed, the display pointer is advanced by one measure and then the navigation display is changed into new one.

As described above, in this embodiment, operation panel 13 is provided with liquid crystal display unit 21 that is capable of making a bit map display and greater in picture size than the prior art display unit, so as to make a guide display for operation timings corresponding to the period of four quarter notes, and to display the corresponding words at the same time. Hence, when a player likes to play with singing, he or she can see both of the guide display for operation timings and the corresponding words at once without turning his or her eyes upon them alternately. This makes it easy both to sing and to play.

Third Embodiment

The third embodiment of the present invention will be described next. The construction of an electronic musical instrument according to this embodiment is substantially the same as that shown in FIG. 2, and the structure of auto-play data used for each auto-play is also substantially the same as that shown in FIG. 9. Note that the same can apply to the constructions of electronic musical instruments and the structures of auto-play data in the other embodiments described later.

Figure 1:
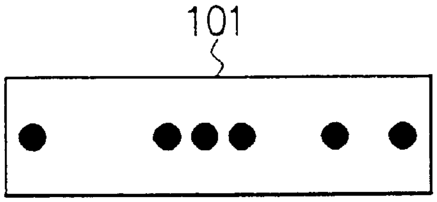
FIG. 1 is a representation of a navigation display made on a prior art display unit.
Figure 10:
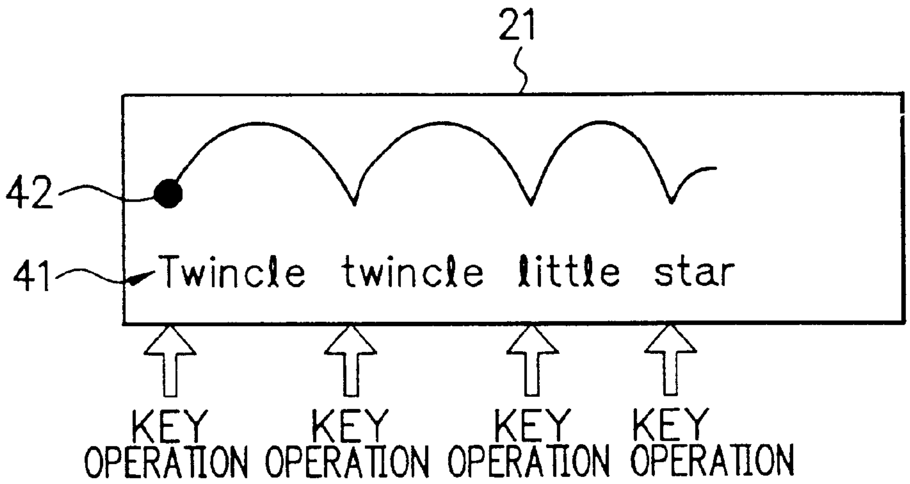
FIG. 10 is a representation of a navigation display made on a display unit installed in an operation panel of an electronic musical instrument according to the third embodiment of the present invention.

FIG. 10 shows an example of navigation display made on liquid crystal display unit 21 according to this embodiment. In this embodiment, words 41 are displayed in place of a note navigation display with static black circles as shown in FIG. 1. Besides, the display is made to look like ball (●) 42 moving with bounding on words 41 synchronously with a player playing (depressing any key).

Each lowermost point of the orbit of ball 42 corresponds to the position right above a character at which the player should make voice simultaneously with depressing any key. Each uppermost point is in the middle of neighboring lowermost points. Since the example of FIG. 10 shows auto-play data that each word constituting words 41 should be pronounced each time any key is depressed, ball 42 moves with bounding at the head portion of each word. The moving speed of ball 42 is determined on the basis of the selected auto-play data and tempo data. With such a navigation display, the player can know that he or she should depress any key the moment ball 42 reaches each lowermost point, and what part of words 41 he or she should sing at the time of pressing the key.

Figure 11:
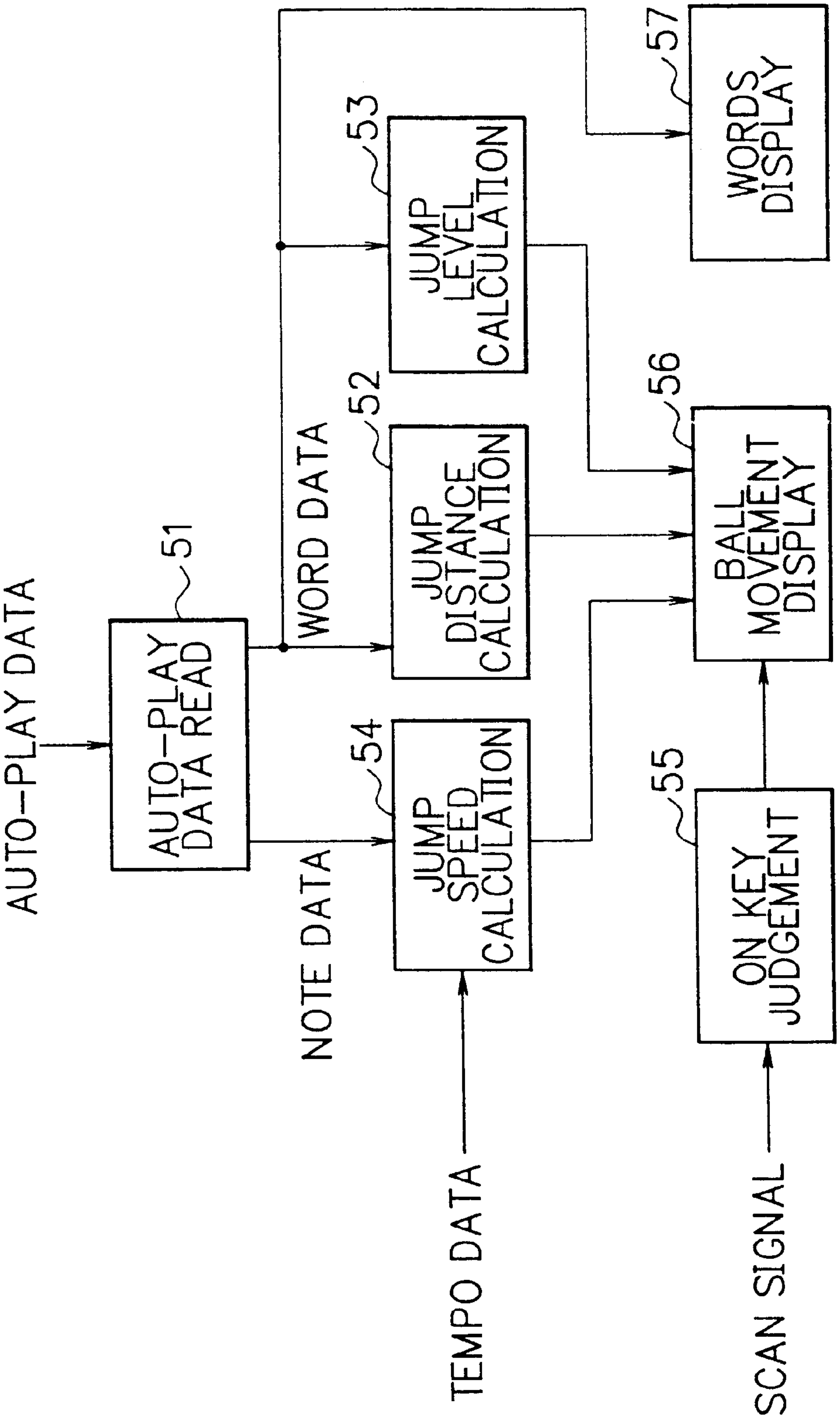
FIG. 11 is a block diagram showing a functional arrangement to realize a navigation display according to the third embodiment.

FIG. 11 is a block diagram showing a functional arrangement to realize such a navigation display. In practice, it comprises, e.g., CPU 10 of FIG. 2, a program stored in ROM 11, RAM 12 as a work area, etc. Processing for the function of FIG. 11 is executed on the basis of play and display pointers on auto-play data under a dual control.

Referring to FIG. 11, play data read part 51 successively reads data corresponding to one display line to display on liquid crystal display unit 21 from among selected auto-play data stored in ROM 11 or RAM 12 in accordance with the advance of the play pointer. Words display part 57 displays words 41 corresponding to one display line on the basis of word data included in the read-out line of the auto-play data.

Jump distance calculation part 52 confirms the number of characters constituting each unit of word data on the basis of word data included in the read-out line of the auto-play data, and calculates a jump distance of ball 42 for each unit of word data.

Jump level calculation part 53 also confirms the number of characters constituting each unit of word data, and calculates heights from the lowermost level to display ball 42 right above the respective characters in each unit of word data. For example, the height from the lowermost level to the uppermost level is divided into five levels, and it is calculated for each character which level ball 42 should be displayed at, or right above which character a display of ball 42 at each level should be made.

Jump speed calculation part 54 calculates a moving speed of ball 42 during one jump (or a moving time for one jump) in relation to each unit of note data on the basis of the units of note data included in the read-out line of the auto-play data, and tempo data having been set with a not-shown tempo set switch or the like provided on operation panel 13.

For example, in case of auto-play data as shown in FIG. 10 wherein a unit of note data is included in each beat and the timing for pronouncing is at the head of each beat, the speed in each jump can be calculated with information on the musical time pattern included in the measure mark within the corresponding note data, and tempo data having been set. In case that units of note data are included in one beat, the pronouncing time difference between neighboring units of note data can be obtained by obtaining the difference between the step times included in the respective units of note data. The speed in one jump can be calculated with the pronouncing time difference and tempo data.

The respective values obtained by calculations in jump distance calculation part 52, jump level calculation part 53 and jump speed calculation part 54 are temporarily stored in a not-shown memory. ON key judgement part 55 judges on the basis of signals sent from keyboard scan circuit 15 of FIG. 2, whether any key is depressed or not. When any key is depressed, ON key judgement part 55 informs ball movement display part 56 of that effect.

When any key is depressed, ball movement display part 56 makes only once a display of a jump of ball 42 according to the depression of the key on the basis of the data stored in the above not-shown memory in accordance with the position of the play pointer at that time. If any key is depressed at each timing that ball 42 reaches the lowermost level, a navigation display is made wherein ball 42 successively moves with bounding on words 41.

In the above example, jump distances, levels and speeds of ball 42 corresponding to one display line have been calculated beforehand in accordance with the advance of the display pointer, and jump displays on that display line are successively made by reading out them in order in accordance with the advance of the play pointer every time any key is depressed. But, calculations of a jump distance, a jump level and a jump speed may be made in accordance with the advance of the play pointer every time any key is depressed.

As described above, in this embodiment, words 41 are displayed in place of a static note navigation display, besides ball 42 is displayed moving with bounding on words 41 synchronously with playing. With such a navigation display, it is indicated to a player that he or she should depress any key when ball 42 comes to a predetermined position (the lowermost point of each jump), and what part of words 41 he or she should sing at the time of pressing the key.

The player, therefore, can easily grasp each operation timing by observing the movement of ball 42. Besides, words of the corresponding song are displayed together. Hence, when the player likes to play with singing, he or she can see both of the guide display for operation timings and the corresponding words at once without turning his or her eyes upon them alternately. Moreover, the player can clearly know from the movement of ball 42 what part he or she should sing now. This makes it easy both to sing and to play.

Fourth Embodiment

In the above third embodiment, for moving ball 42 on words 41, a jump distance and a jump level are calculated on the basis of the number of characters in word data. In this fashion, however, at such a position that there is a note but no word as shown with ※ mark in auto-play data of FIG. 12, any jump distance and any jump level can not be calculated because the number of characters is "0". As a result, ball 42 stops at a corresponding position and no more operation timings can be indicated.

Figure 13:
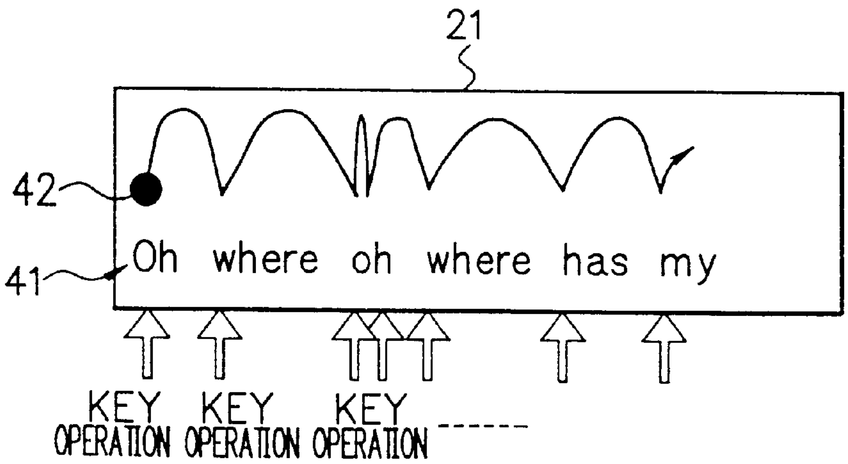
FIG. 13 is a representation of a navigation display made on a display unit installed in an operation panel of an electronic musical instrument according to the fourth embodiment.

The fourth embodiment of the present invention is for solving the above problem. FIG. 13 shows an example of navigation display made on liquid crystal display unit 21 according to this fourth embodiment. As shown in FIG. 13, in this embodiment, when a navigation display is made in which ball 42 moves with bounding on words 41 synchronously with playing and there is a position with a note (note data) but no word, ball 42 is made to jump vertically at the first note position with a word after the position with the note but no word. The operation timing corresponding to the position only with the note is indicated thereby, and the successive operation timings can surely be indicated.

Figure 12:
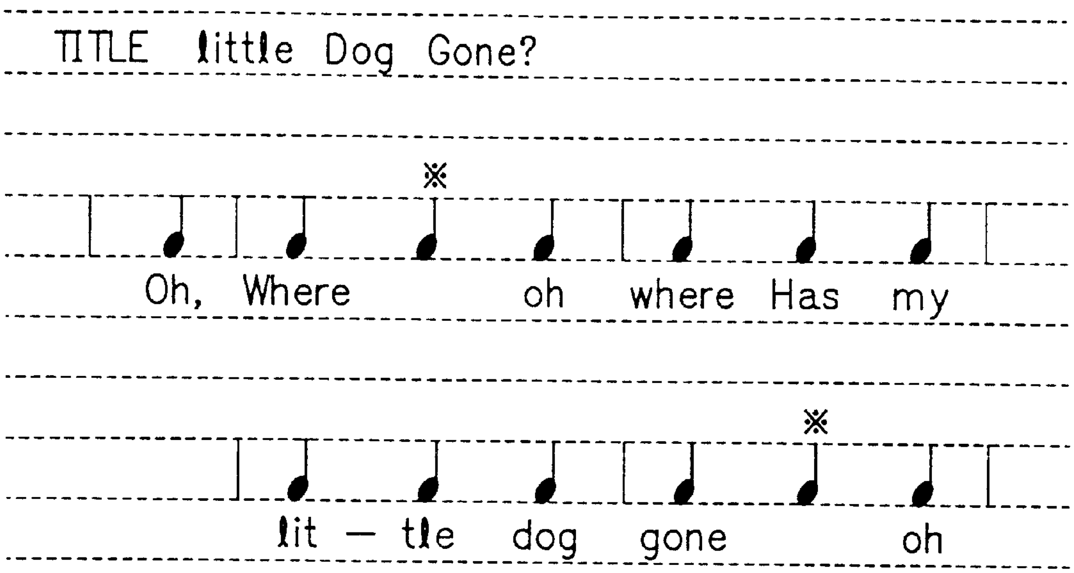
FIG. 12 is a representation for use in the explanation of the fourth and fifth embodiments of the present invention.

More specifically, in the example of FIG. 13, when any key is depressed at the timing that ball 42 comes to the upper portion of "Where" of the second word from the left, ball 42 further moves toward the upper portion of "oh" of the third word on the basis of a jump distance, etc., calculated with the number of characters of the word "Where" + one blank. Although any key should be depressed when ball 42 reaches the upper portion of the word "oh", the proper note data corresponding to this operation timing is data with no word between "Where" and "oh" as shown in FIG. 12. For this reason, in case of the above third embodiment, ball 42 stops at this position.

In this fourth embodiment, however, ball 42 is made to jump vertically at the position right above the word "oh", i.e., at the first note position with a word after the position with no word. The jump speed in this case is calculated with the difference between the step times included in the note data corresponding to the note with no word and included in the note data corresponding to the next note at the word "oh", and tempo data. After this, when any key is depressed at the timing that ball 42 having jumped vertically falls to the position right above the word "oh", ball 42 moves toward "where" of the fourth word on the basis of a jump distance, etc., calculated with the number of characters of the word "oh" + one blank.

As described above, according to this embodiment, in case of a navigation display wherein ball 42 moves with bounding on words 41, ball 42 is made to jump vertically once at the first note position with a word after the position with a note but no word. Hence, the operation timing corresponding to the position only with the note and the successive operation timings can surely be known.

Fifth Embodiment

The fifth embodiment of the present invention shows another example for solving the problem of the third embodiment that ball 42 stops when auto-play data includes a portion that there is a note data but no word corresponding to the note data. In this fifth embodiment, an arbitrary mark, character, or the like is automatically inserted to the position that there is a note but no word, and it is also displayed as part of words to make ball 42 jump.

Figure 14:
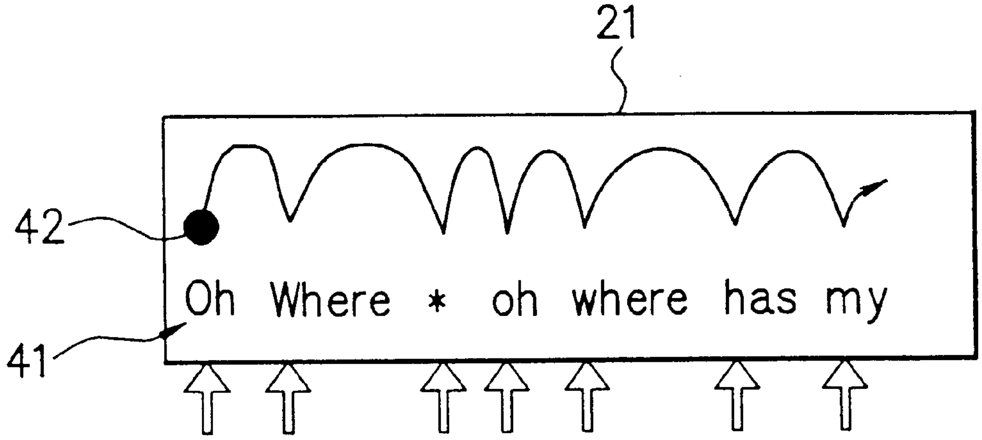
FIG. 14 is a representation of a navigation display made on a display unit installed in an operation panel of an electronic musical instrument according to the fifth embodiment.

For example, in the auto-play data of FIG. 12, there is a note with no word, e.g., between "Where" and "oh". Hence, in this case, as shown in FIG. 14, * mark is automatically generated and inserted to that portion, and displayed on liquid crystal display unit 21. Ball 42 is moved also on * mark inserted.

More specifically, when any key is depressed at the timing that ball 42 comes to the upper portion of the word "Where", ball 42 further moves toward the upper portion of the mark "*" on the basis of a jump distance, etc., calculated with the number of characters of the word "Where". After this, when any key is depressed at the timing that ball 42 reaches the upper portion of the mark "*", ball 42 further moves toward the upper portion of the next word "oh" on the basis of a jump distance, etc., calculated by counting the mark "*" as one character.

Figure 15:
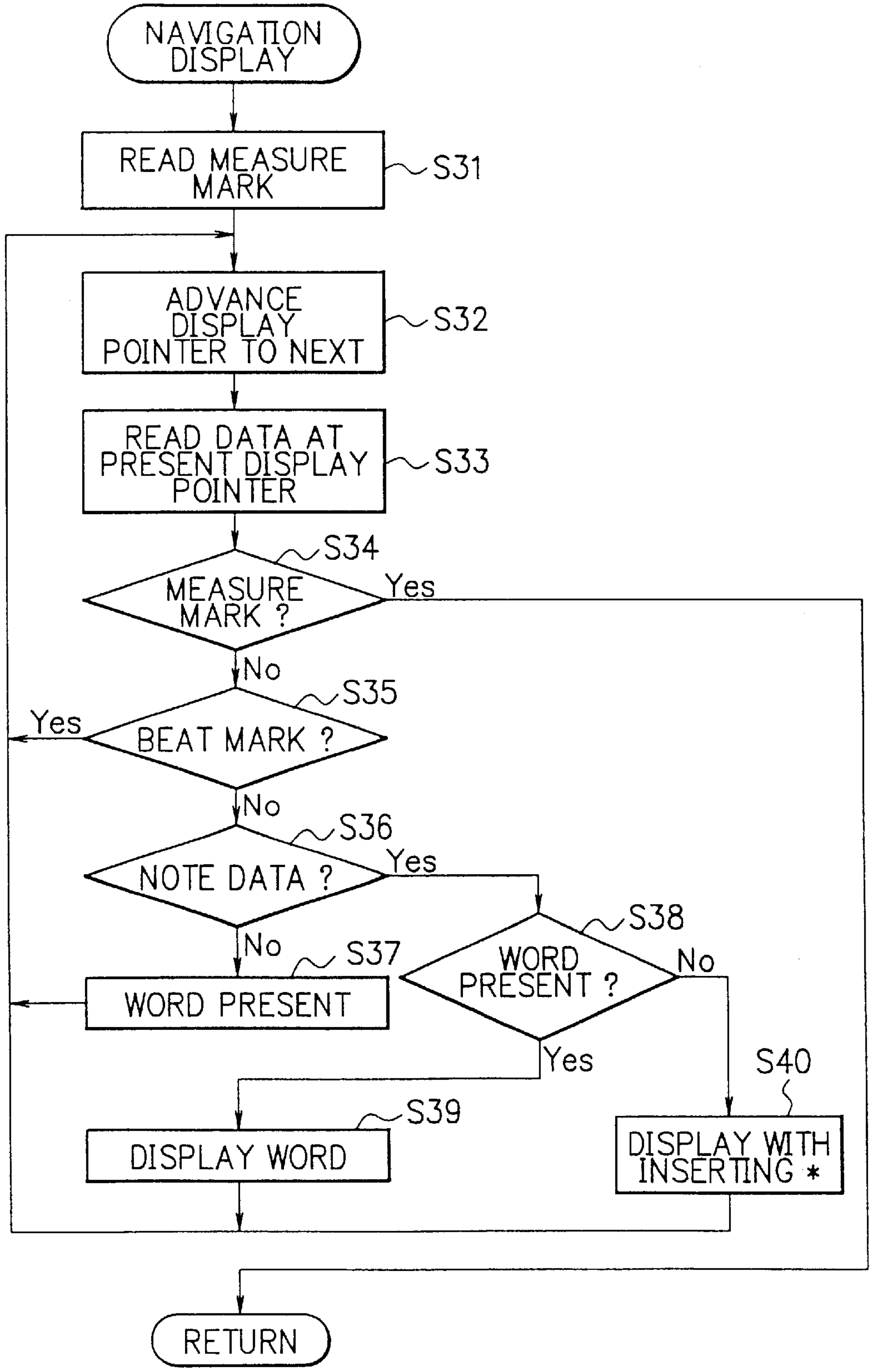
FIG. 15 is a flowchart of navigation display processing executed in accordance with the advance of a display pointer, according to the fifth embodiment.

FIG. 15 shows a flowchart of processing for making a navigation display of one display line on liquid crystal display unit 21 according to this embodiment. Processing of this flowchart is executed with a display pointer. Since such a navigation display is made in a unit of one measure, the display pointer always stops at each measure mark. For this reason, in the first step S31 of this navigation display process, CPU 31 reads a measure mark.

CPU 10 then advances the display pointer to the next position, in step S32, and then reads the data indicated with the display pointer at that time, in step S33. In step S34, CPU 10 judges whether the read-out data is a measure mark or not. If not, the flow advances to step S35, wherein CPU 10 further judges whether the read-out data is a beat mark or not. When the read-out data is a beat mark, the flow returns to step S32. When the read-out data is not any beat mark, the flow advances to step S36, wherein CPU 10 further judges whether the read-out data is note data or not.

If the judgement result in the above step S36 is NO, the read-out data is word data. In this case, the flow advances to step S37, wherein CPU 10 recognizes that the word data corresponding to note data is present. The flow then returns to step S32. When the read-out data is note data, the flow advances to step S38, wherein CPU 10 judges whether word data corresponding to the note data is present or not.

When the corresponding word data is present, the flow advances to step S39, wherein the word is displayed on liquid crystal display unit 21. If the corresponding word data is not present, the flow advances to step S40, wherein "*" mark is automatically inserted to that portion and displayed on liquid crystal display unit 21. After the above step S39 or S40, the flow returns to step S32, wherein CPU 10 advances the display pointer to the next position. In step S33, CPU 10 read the data newly indicated with the display pointer. In step S34, CPU 10 judges whether the read-out data is a measure mark or not. When the read-out data is a measure mark, this navigation display process is ended because the navigation display of one line has been completed.

When jump distances, levels and speeds of ball 42 corresponding to one measure are calculated beforehand in accordance with the advance of the display pointer as described in the third embodiment, they are calculated also with "*" mark inserted in step S40, though it is not shown in FIG. 15, The step of executing such calculations is provided, e.g., at the last position of the process loop shown in FIG. 15, that is, a position before the flow returns to step S32.

Alternately, when calculations of a jump distance, a jump level and a jump speed are made in accordance with the advance of the play pointer every time any key is depressed, the step of executing such calculations is provided in an ON key process (executed when any key is depressed) other than this navigation display process.

As described above, in this embodiment, when a navigation display is made in which ball 42 moves with bounding on words 41, a predetermined mark or the like is automatically inserted to each position that there is a note but no word so that ball 42 moves also on the inserted mark or the like. Hence, a player can surely know the next operation timing even after the position that there is a note but no word. Besides, the player can easily recognize, with such a mark or the like, the fact that he or she should depress any key at that timing but there is no word to sing.

Sixth Embodiment

In the above third to fifth embodiments, liquid crystal display unit 21 displays only a navigation display of one display line corresponding to the period of four quarter notes. In this fashion, however, a player can know only operation timings in the immediate future. Besides, the navigation display changes to the next one after the last playing operation of the present display has been executed. At that time, the player can not know the next operation timing until the display changes. This makes it hard to play.

Figure 16:
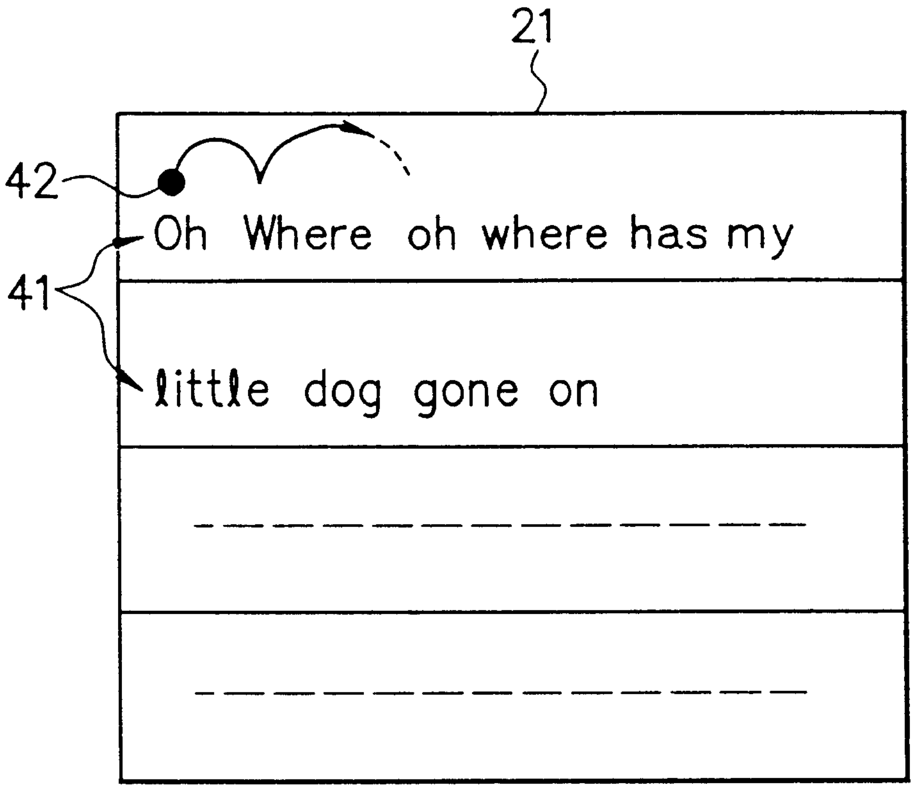
FIG. 16 is a representation of a navigation display made on a display unit installed in an operation panel of an electronic musical instrument according to the sixth embodiment of the present invention.

Hence, in this sixth embodiment of the present invention, made is a navigation display of four display lines each corresponding to the period of four quarter notes as shown in FIG. 16. Besides, by devising a manner of changing the navigation display, the information content of the navigation display is increased to make it easier to play and song.

Referring to FIG. 16, on each display line in the picture of liquid crystal display unit 21, displayed are words 41 that respectively corresponds to the first beat, second beat, etc., from the left to the right. Ball 42 moves with bounding on words 41 every time any key is depressed. When any key is depressed at the last operation timing on the first display line, ball 42 shifts to the head of the second display line and moves with bounding on words 41 of the second display line.

When any key is depressed at the first operation timing on the fourth display line, the first display line of the navigation display, all operation timings on which had been completed, is changed into new first display line following the present fourth display line. That is, navigation display processing as shown in FIG. 15 is executed once (so as to correspond to one measure). If the present auto-play data is completed on the fourth display line, such a change of navigation display is not executed.

When any key is depressed at the first operation timing of the new first display line after auto-playing corresponding to the fourth display line is completed, the second to fourth display lines of the navigation display, all operation timings on which had been completed, are changed into new second to fourth display lines following the new first display line. That is, navigation display processing as shown in FIG. 15 is executed three times (so as to correspond to three measures).

If the auto-play data is completed on the new first display line (the fifth display line in the aggregate), such a change of navigation display is not executed. In such a case, the second to fourth display lines may be replaced by blank. If the rest of the auto-play data is less than three display lines of the second to fourth display lines, it may be possible to display with black circles 22 only the operation timings corresponding to the rest of the auto-play data and followed by blank. The example of FIG. 3D indicates that the auto-play data is completed on the new third display line.

In this example, the first display line is changed when any key is depressed at the first operation timing on the fourth display line. But, it may be changed when any key is depressed at a predetermined operation timing after the first operation timing on the fourth display line (except the last operation timing). It may also be changed when any key is depressed at a predetermined operation timing on the second or third display line before the fourth display line.

Besides, in this example, the second to fourth display lines of the navigation display are changed when any key is depressed at the first operation timing of the new first display line. But, it may be changed when any key is depressed at a predetermined operation timing after the first operation timing on the first display line (except the last operation timing).

In short, any fashion can be employed if a navigation display is changed into the next one not immediately before or after auto-playing corresponding to the last display line is completed but when the part of auto-play data corresponding to the last display line remains to some degree. But, if the navigation display is changed at a too early timing, it may become hard to recognize what part auto-playing has been completed to. Hence, the above example is preferable.

Besides, in the above example, the first display line is changed when any key is depressed at the first operation timing on the fourth display line. But, there may be a case that the data corresponding to the fourth display line is a whole rest. In such a case, the fourth display line becomes blank as a matter of course. This makes it hard to judge whether the fourth display line is a whole rest or the auto-play data is completed on the third display line. Hence, in such a case, the first display line may be changed when the player depresses any key at the first operation timing on the third display line.

Figure 17:
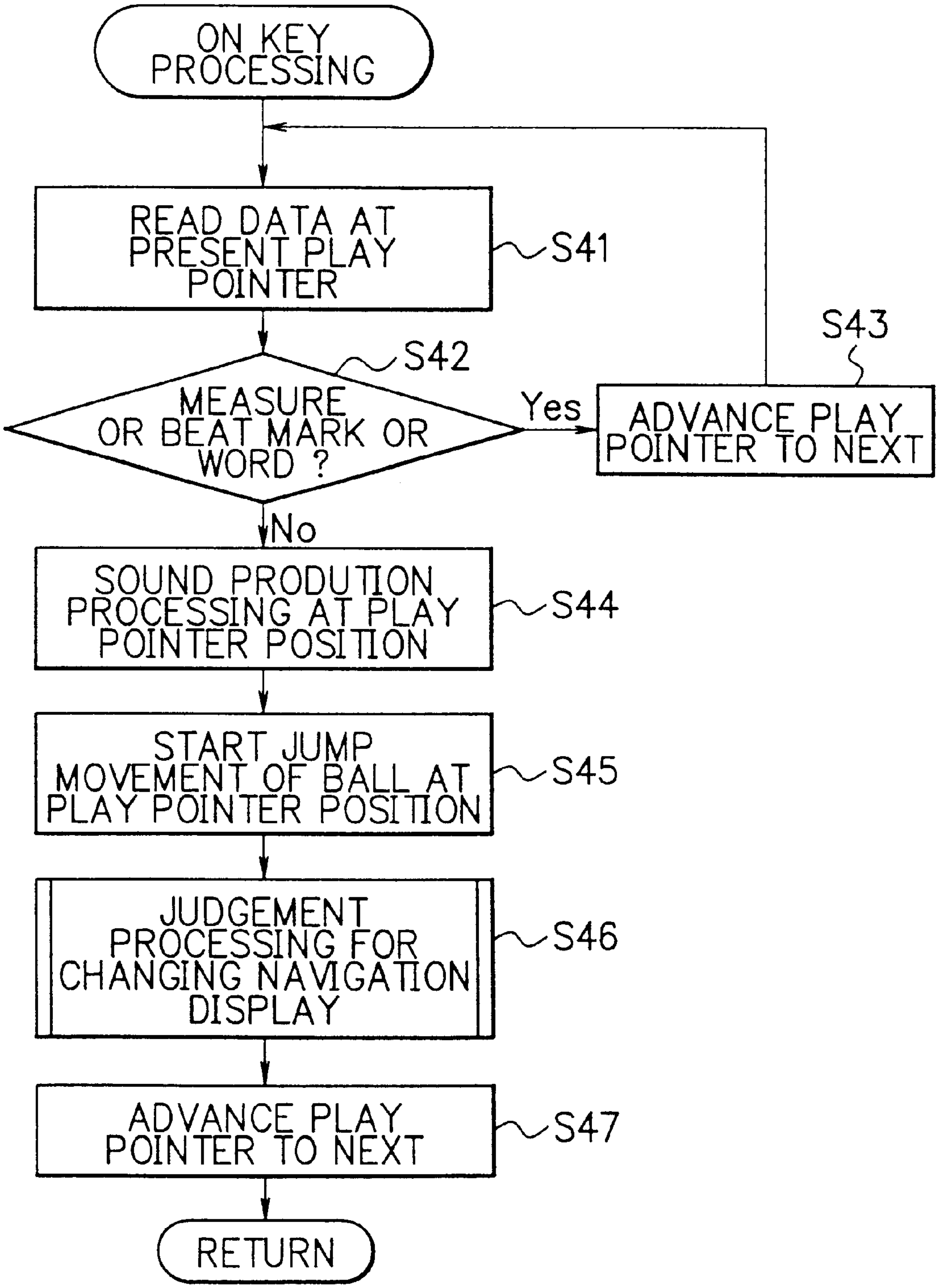
FIG. 17 is a flowchart of sound production processing executed in accordance with the advance of a play pointer, according to the sixth embodiment.

The flowcharts shown in FIGS. 7, 15 and 17 can apply to the corresponding operations of an electronic musical instrument according to this sixth embodiment. As described above, either of auto-play processing and navigation display processing is executed on the basis of auto-play data. But, as for readout pointer on the auto-play data, a dual control is made with a play pointer and a display pointer. Navigation display processing with the display pointer had been explained with reference to FIG. 15.

FIG. 17 shows a flowchart of sound production processing based on auto-play data executed in accordance with the advance of the play pointer. In this example, jump distances, levels and speeds of ball 42 are calculated beforehand in accordance with the advance of the display pointer, and the step of executing such calculations is not included in the flowchart of FIG. 17.

Referring to FIG. 17, when any key is depressed, CPU 10 reads data presently indicated with the play pointer within auto-play data stored in ROM 11 or RAM 12, in step S41. In step S42, CPU 10 judges whether or not the read-out data is a measure or beat mark or word data. If the judgment result is YES, the read-out data is not note data so the flow advances to step S43, wherein the play pointer is advanced to the next position and then the flow returns to step S41.

When the read-out data is not any of measure and beat marks and word data, the read-out data is note data. In this case, the flow advances to step S44. In step S44, CPU 10 makes sound source 17 execute sound production processing in accordance with the note data presently indicated with the play pointer. In step S45, ball 42 at the position corresponding to the present play pointer is made to start one time of jumping movement. After this, judgement processing for changing the navigation display as shown in FIG. 7 is executed in step S46, the play pointer is advanced to the next position, in step S47, and then this ON key process is ended.

In this example, calculations of jump distances, levels and speeds of ball 42 are executed in the process of the flowchart of FIG. 15 (before the flow returns to step S32 though not shown) for executing processing of step S25 or S28 shown in FIG. 7.

As described above, in this embodiment, liquid crystal display unit 21 makes a navigation display of four display lines each corresponding to the period of four quarter notes. Hence, the player can play with recognizing not only the operation timing just after the present one but also operation timings in a fairly far future. This makes it easy to play.

Bedsides, in this embodiment, while the player plays in accordance with a display line of a navigation display, one or more display lines of the navigation display, all operation timings on which had been already executed, is changed into new display lines. For example, the first display line of the present navigation display is changed into new one when auto-playing progresses to enter the last display line, and the display lines after the first display line are changed into new ones when auto-playing progresses to shift from the last display line to the new first display line. In this manner, a navigation display for a future is always given with enough time. This makes it easier to grasp each operation timing and makes it still easier to play.

In the above sixth embodiment, made is a navigation display of four display lines each corresponding to the period of four quarter notes. But the number of display lines is not limited to four. Any number but one can be employed. Besides, the length of each display line is not limited to that corresponding to the period of four quarter notes. It may be longer or shorter than that. Besides, as had been described above, the timings for changing the navigation display are not limited to the first operation timings on the first, third and fourth display lines.

In the above first to sixth embodiments, an auto-play apparatus according to the present invention applies to a keyed instrument with keyboard 16 such as an electronic piano, an electronic organ, or a synthesizer. But, it can also apply to an electronic musical instrument with operation pieces other than keys, e.g., pads. Besides, an electronic musical instrument of the present invention may comprise an auto-play apparatus itself with an exclusive operation member.

Besides, in the above embodiments, black circles 22 and ball 42 are used for indicating operation timings. But they never limit the present invention. For example, it may be possible to prepare some kinds of marks beforehand so that a player can select one from among them optionally. Besides, it may also be possible that a player can freely make a mark to use.

Furthermore, in the above embodiments, each function of auto-play apparatus is realized in a microcomputer system including a CPU, a ROM, a RAM, etc., and the operation is implemented in accordance with a work program stored in the ROM or RAM, as described above. In such a case, part or all of the functions can be realized by using a program supplied from the outside to the computer system through a recording medium.

As a recording medium for storing such a program, usable is a floppy disk, a hard disk, an optical disk, a magnetic optical disk, a CD-ROM, a CD-I, a CD-R, a CD-RW, a DVD, a zip, a magnetic tape, a non-volatile memory card, etc.

Besides, other than the case that a computer system executes a supplied program to realize part or all of the functions of the above embodiments, in case that a supplied program cooperates with an OS (operating system) or another application software working in a computer system to realize part or all of the functions of the above embodiments, or part or all of processing of a supplied program is executed in a functional extension board or unit of a computer system, such programs are included in embodiments of the present invention.

What is claimed is:

1. An electronic musical instrument having an auto-play function in which auto-playing is performed with reading out a predetermined quantity of auto-play data prepared beforehand, in order every time an operation piece is operated, said instrument comprising:

guide display means for making a guide display based on said auto-play data for indicating operation timings for operating said operation piece, said guide display comprising a plurality of display lines;

wherein said guide display means changes one or more display lines presently displayed, all operation timings on which had been executed, into new display lines based on said auto-play data when a predetermined operation timing on a predetermined display line is executed;

wherein said guide display means changes a first display line presently displayed into a new first display line when a predetermined operation timing on last a display line presently displayed is executed, and changes the display lines after the first display line presently displayed into new display lines when a predetermined operation timing on the new first display line is executed.

2. A computer-readable recording medium storing a program for making a computer function as a guide display and to perform:

reading out a predetermined quantity of auto-play data prepared beforehand, every time an operation piece is operated;

making the guide display based on said auto-play for indicating operation timings for operating said operation piece, the guide display comprising a plurality of display lines;

changing one or more display lines presently displayed, all operation timings on which had been executed, into new display lines based on said auto-play data when a predetermined operation timing on a predetermined display line is executed;

changing a first display line presently displayed into a new first display line when a predetermined operation timing on a last display line presently displayed is executed; and changing the display lines after the first display line presently displayed into new display lines when a predetermined operation timing on the new first display line is executed.

3. An electronic musical instrument having an auto-play function in which auto-playing is performed with reading out a predetermined quantity of auto-play data prepared beforehand, in order every time an operation piece is operated, the auto-play data includes note data and word data from words of a corresponding song, the instrument comprising:

guide display means for displaying words based on word data in said auto-play data and making a guide display based on word data and note data in said auto-play data for indicating operation timings for operating said operation piece, with a predetermined mark moving with bounding on said words displayed synchronously with operations of said operation piece;

wherein said guide display means makes a display comprising a plurality of display lines for words and said predetermined mark moving on the words;

wherein said guide display means changes one or more display lines for words presently displayed, all operation timings on which had been executed, into new display lines for words based on said auto-play data when a predetermined operation timing on a predetermined display line is executed;

wherein said guide display means changes a first display line for words presently displayed into a new first display line for words when a predetermined operation timing on a last display line presently displayed is executed and changes the display lines for words after the first display line presently displayed into new display lines for words when a predetermined operation timing on the new first display line is executed.

* * * * *